Dec. 10, 1940.   R. LARAQUE   2,224,481
AUTOMATIC MECHANICAL RETURN DEVICE
Filed March 17, 1939   3 Sheets-Sheet 1

INVENTOR.
ROLAND LARAQUE.
BY
ATTORNEY.

INVENTOR.
ROLAND LARAQUE.
BY
ATTORNEY

Patented Dec. 10, 1940

2,224,481

UNITED STATES PATENT OFFICE 2,224,481

AUTOMATIC MECHANICAL RETURN DEVICE

Roland Laraque, Paris, France

Application March 17, 1939, Serial No. 262,510
In Luxemburg March 18, 1938

3 Claims. (Cl. 244—102)

The present invention has for its object a mechanical return device to a given position of all parts capable of performing evolutions within a certain limit, about an axis of rotation such as trap doors, panels or other material of all kinds.

The invention is more particularly suitable in the case where the device is to serve as a strut, stay or counter-brace or similar organ. Thus it can for instance be applied for returning the retracted landing gear of aircraft to the lowered position where the device has the advantage over other systems of necessitating no supplementary fixing accessories.

A feature of the device resides in that it comprises two elements articulated to one another in known manner and on one of which is arranged a powerful resilient system (with springs or pneumatic or hydropneumatic) acting on a pusher provided with rollers and which bears on a cam carried by the second element and of a shape such that it tensions the spring from the start of the folding of the one element on the other and that it serves as the point of application of the force accumulated by the spring at the extension of the elements which force must ensure the energetic return of these latter to their position of alignment.

The characteristics of this device will moreover be brought out during the course of the following description and with reference to the accompanying drawings which relate to means for automatic keeping in position of an aircraft landing gear.

Figure 1:
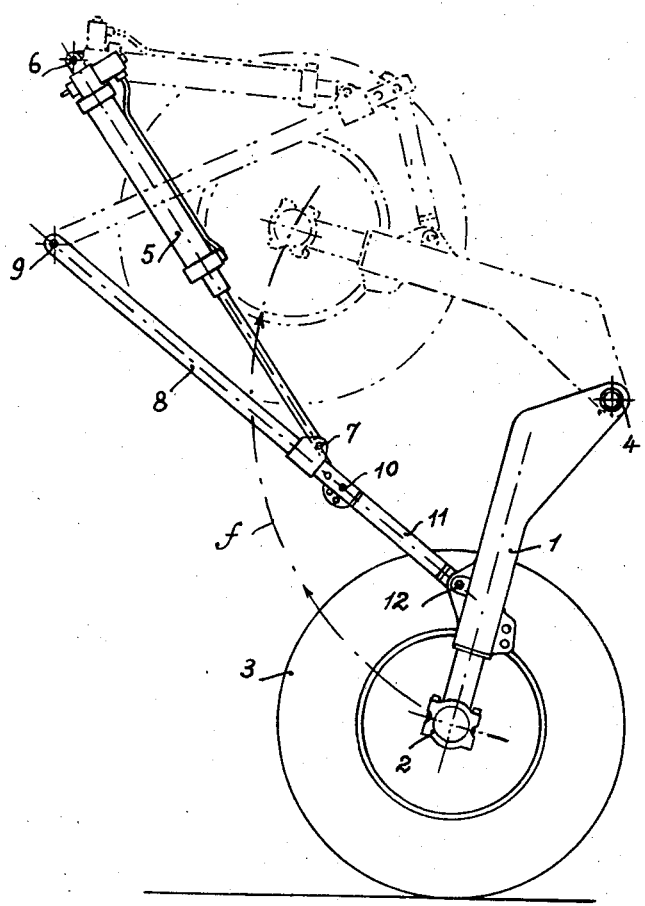
Figure 2:
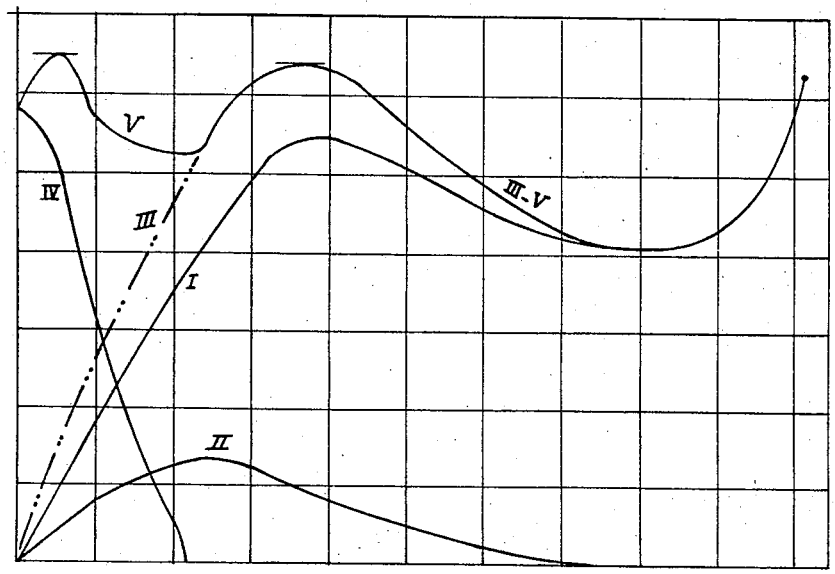
Figure 4:
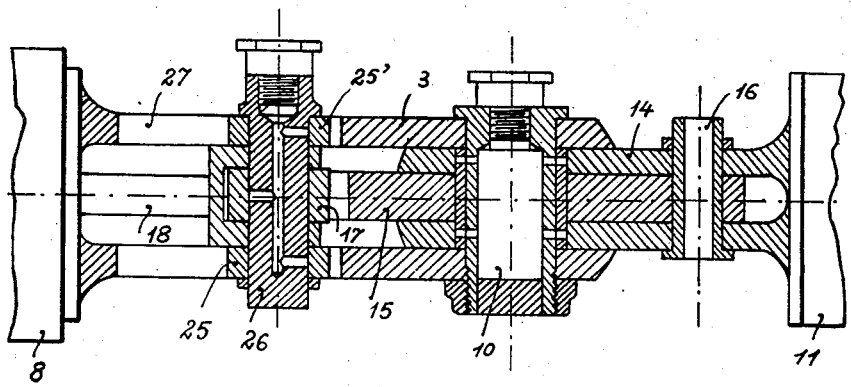
Figure 3:
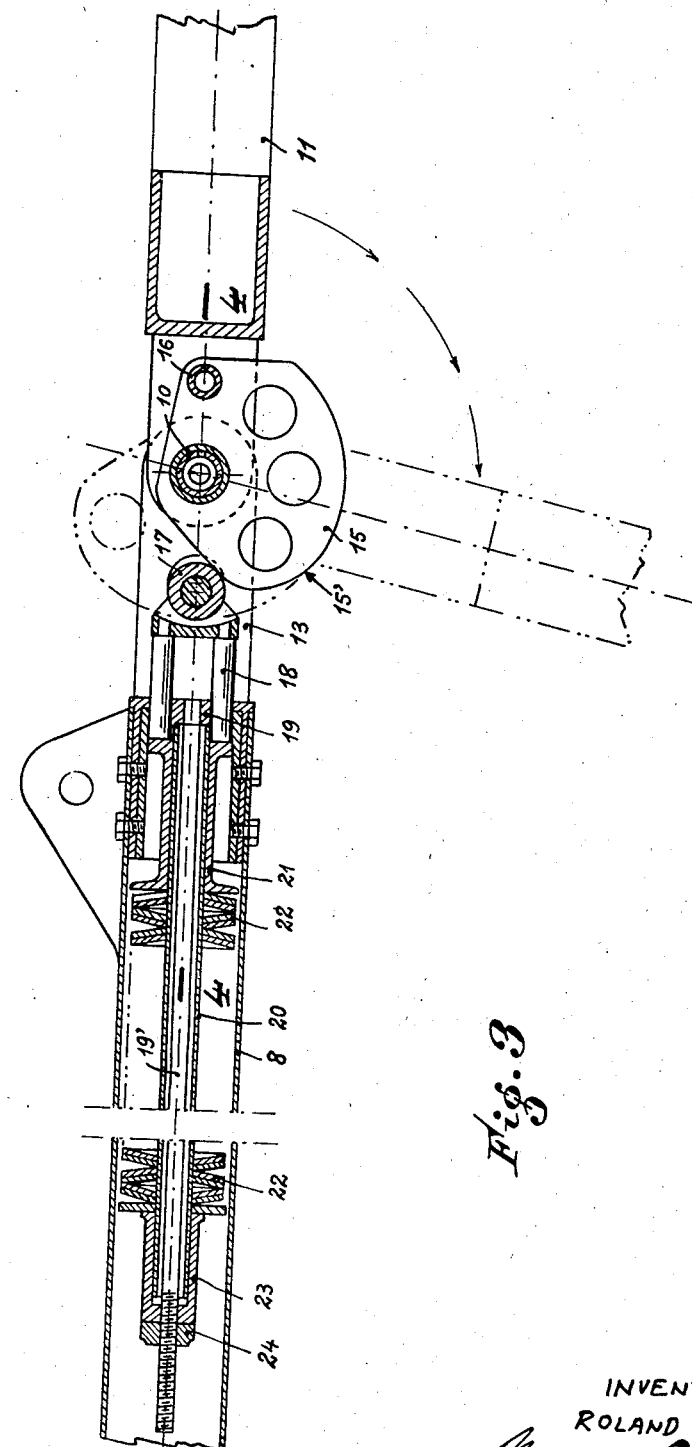

The drawings show by way of example:

Fig. 1, means for lifting and keeping in position the landing gear of an aircraft;

Fig. 2, the working diagram of a lifting jack for the said landing gear;

Fig. 3, the return device shown in longitudinal section;

Fig. 4, a section taken on the line 4—4 of Fig. 3.

It is known that a landing gear generally consists of two half gears each comprising a fork, a lifting device and a stiffening device.

The fork comprises two resilient limbs 1 (Fig. 1) terminated by a bearing 2 in which is mounted the axis of the wheel 3. Each half gear is articulated on an axle 4 carried by the motor spindle of the aircraft.

The raising of the half gear is ensured by one or more jacks 5 articulated on the one hand at 6 on the said driving axle and on the other hand at 7 on the front bar 8 of the stiffening or bracing device.

This bar 8 is itself articulated at 9 on the driving axle and at 10 on the rear bar 11 which is articulated to the half gear at 12, for example.

With a landing gear mounted in this manner the work of each jack 5 can be represented by the diagram shown in Fig. 2.

On this latter, the load proper due to the weight applied to the spindle of the jack is shown by the curve I and the load due to the wind by the curve II.

The curve III represents the resultant of the weight and the wind (in the case where their effects add together).

It will immediately be seen that part of the force set up in the jack remains unutilised at the start of the course of the movable equipment thereof.

If one then uses the device made in accordance with the invention this force can be utilised for setting a resilient system adapted to ensure a strong return action of the bars 8 and 11 to alignment.

In one form of construction given by way of simple example, the particular fitting of system for maintaining the gear in position is effected as follows:

The bar at the front is formed of a tubular body 8 (Fig. 3 and 4) terminated at its upper extremity by an articulation shackle on the driving axle and, at its lower extremity, by a second shackle 13 through which passes the articulation axis 10 of the rear bar 11.

On the axis 10 can pivot the said rear bar which is provided, for this purpose, with a shackle 14 embracing a cam 15 secured both by the axle 10 and by a pin 16.

On the cam 15 rests, through the intermediary of a roller 17, a pusher 18 consisting of two limbs passing through the end 19 of the tubular body 8 of the front bar.

In the bottom or end 19 is screwed a rod 19' surrounded by a tube 20 which bears on the end and which passes through a sleeve 21 integral with the limbs of the pusher 18.

The tube 20 serves as guiding member for washers 22 of the type known by the name of "Belleville" held piled together under tension against the sleeve 21 by a cap 23 the position of which may be regulated by a nut 24 screwing on rod 19', and permits of modifying the pressure exerted by the washers on the said sleeve.

It will immediately be seen that the latter can slide in the tube 8 in relation to the end 19 which limits its travel towards the articulation 10.

This sliding movement is guided on the one hand by the end 19 and on the other hand by rollers 25 mounted on the axle 26 of the roller 17 and running in slideways 27 formed in the wings of the shackle 13.

The operation of the device is as follows:

When the raising operation takes place (Fig. 1) the landing gear describes about the axle 4, an arc of circle $f$ under the traction of the jack 5. This rotation is rendered possible by the hinge 10 which allows the stiffening or bracing system to fold as is shown in dot and dash lines in Fig. 1. This done the cam 15 pushes back the pusher 18 and the sleeve 21 which compresses the washers 22 against the cap 23.

This compression takes effect at the commencement of the folding or raising action of the stiffening system and absorbs power, in the working of the jack 5, which can be represented by the curve IV of the diagram in Figure 2.

Henceforth it will be seen from an examination of this diagram that the resultant load: weight of the gear, wind and return movement of the mechanism, can be depicted by the curve V which represents a much more rational use of the power set up and consequently, corresponds to a better efficiency than that represented by the curve III.

It follows that without use of supplementary air, the device described hereinbefore permits of storing, by reason of the setting of the spring formed by the washers 22, a force utilizable at the lowering of the gear.

It will be seen in fact that the spring set from the start of the raising of the gear is held so for the remainder of the course of the cam 15 starting at the point 15', without requiring from the jack any effort other than the very small amount required to overcome the friction of the roller 17 and of the axle 10.

At the lowering of the gear it is unnecessary for the major part of the course, to use any source of power other than that provided by the gear and in case of need, the effort exerted by the wind on the latter. But especially at the end of the course, the influence of the weight diminishes and it is at this moment that the tautened spring acts on the cam 15 to cause the energetic alignment of the two bars of the bracing system, the return effort being, for instance, maximum when the alignment is effected.

This last feature therefore presents all the advantages of ensuring, with a suitable adjustment of the bracing system to cause a slight break in alignment towards the base, safety in landing in the case where the locking action or holding ensured by the jack should accidently have become insufficient.

It is obvious that modifications in shape and detail can be embodied in the device described hereinabove by way of simple example, any other manner of accumulating power being utilisable for the same object without thereby exceeding the spirit of the invention, although it is the washer arrangement which by the number and their moderate rate of work, which can ensure the more certain return function.

Nevertheless said washers can be replaced by washers of rubber, insulated or not from each other by metal washers or by coil springs or by reinforced rubber washers or even by a pneumatic or hydro-pneumatic arrangement.

What I claim is:

1. In aircraft having a fuselage and a forked landing gear; comprising a tubular member articulated to said fuselage, a rod member articulated to the fork of said landing gear, an axle, said tubular member and said rod member being pivoted about said axle, cam means mounted on said axle and fixed to said rod member to swing therewith about said axle, a plunger including an element bearing against said cam means, said plunger extending within and being slidably operable relatively to said tubular member, and resilient means within said tubular member urging said plunger against said cam means, whereby upon retraction of said landing gear said tubular member and said rod member are positioned out-of-alinement and upon expansion of said resilient means said tubular member and said rod member are brought into alinement.

2. In an aircraft having a fuselage and a forked landing gear; comprising a tubular member articulated to said fuselage, a rod member articulated to the fork of said landing gear, an axle, said tubular member and said rod member being pivoted about said axle, cam means mounted on said axle and fixed to said rod member to swing therewith about said axle, a plunger including an element bearing against said cam means, said plunger extending within and being slidably operable relatively to said tubular member, resilient means within said tubular member, and means for regulating said resilient means and forming an abutment therefor, said resilient means urging said plunger against said cam means, whereby upon retraction of said landing gear said tubular member and said rod member are positioned out-of-alinement and upon expansion of said resilient means said tubular member and said rod member are brought into alinement.

3. In aircraft, as claimed in claim 1, said resilient means including a rod, and a plurality of rubber washers with metallic discs between respective washers mounted on said rod.

ROLAND LARAQUE.